United States Patent
Nishida et al.

(10) Patent No.: US 10,423,841 B2
(45) Date of Patent: Sep. 24, 2019

(54) ABNORMALITY DETECTION DEVICE AND ABNORMALITY DETECTION METHOD

(71) Applicant: HITACHI, LTD., Chiyoda-ku, Tokyo (JP)

(72) Inventors: Takehisa Nishida, Tokyo (JP); Mariko Okude, Tokyo (JP); Masayoshi Ishikawa, Tokyo (JP); Kazuo Muto, Tokyo (JP); Atsushi Katou, Tokyo (JP)

(73) Assignee: HITACHI, LTD., Tokyo (JP)

( * ) Notice: Subject to any disclaimer, the term of this patent is extended or adjusted under 35 U.S.C. 154(b) by 85 days.

(21) Appl. No.: 15/794,136

(22) Filed: Oct. 26, 2017

(65) Prior Publication Data

US 2018/0137377 A1 May 17, 2018

(30) Foreign Application Priority Data

Nov. 14, 2016 (JP) ................................. 2016-221590

(51) Int. Cl.
*G06K 9/00* (2006.01)
*G01C 22/00* (2006.01)
(Continued)

(52) U.S. Cl.
CPC ..... *G06K 9/00805* (2013.01); *G06K 9/00791* (2013.01); *G06K 9/00798* (2013.01);
(Continued)

(58) Field of Classification Search
USPC ....... 382/100, 103–108, 154, 155, 162, 168, 382/171, 173, 181, 189–190, 199, 209,
(Continued)

(56) References Cited

U.S. PATENT DOCUMENTS 8,791,803 B2 * 7/2014 Ishikawa ............. G01M 15/042
340/425.5
2009/0179777 A1 * 7/2009 Ishikawa ............. G01M 15/042
340/939
(Continued)

FOREIGN PATENT DOCUMENTS

DE 10 2015 206 605 A1 10/2016
JP 2009-166541 A 7/2009
(Continued)

OTHER PUBLICATIONS

Extended European Search Report issued in corresponding application No. 17199257.1 dated Apr. 30, 2018.

*Primary Examiner* — Seyed H Azarian
(74) *Attorney, Agent, or Firm* — Foley & Lardner LLP (57) ABSTRACT

An abnormality detection device includes a space recognition success determination unit which determines whether an outside space recognition device is successful in space recognition from information which contains space recognition information and environment information, an environment dependence recognition failure classifying unit which determines and classifies whether a failure of the space recognition corresponds to any one of a failure type previously stored in an environment dependence recognition failure type storage unit with respect to the space recognition information determined as failing in the space recognition, and an abnormality detection unit which uses the space recognition information determined as not corresponding to any failure type by the environment dependence recognition failure classifying unit to detect an abnormality of the outside space recognition device in the space recognition information determined as failing in the space recognition.

7 Claims, 7 Drawing Sheets

(51) Int. Cl.
*G08G 1/01* (2006.01)
*G08G 1/048* (2006.01)
*G07C 5/08* (2006.01)
*G06K 9/62* (2006.01)

(52) U.S. Cl.
CPC ....... *G06K 9/00818* (2013.01); *G06K 9/6284* (2013.01); *G07C 5/0808* (2013.01); *G07C 5/0816* (2013.01); *G08G 1/0112* (2013.01); *G08G 1/0129* (2013.01); *G08G 1/048* (2013.01)

(58) Field of Classification Search
USPC ....... 382/224, 232, 254, 274, 276, 286–291, 382/305, 321; 340/939, 425.5; 701/31.4, 701/23; 455/506
See application file for complete search history.

(56) References Cited

U.S. PATENT DOCUMENTS

2013/0317692 A1* 11/2013 Iga .................. G07C 5/008
    701/31.4
2016/0128075 A1* 5/2016 Kremo .............. H04B 17/3911
    455/506
2016/0293005 A1* 10/2016 Nomoto .......... G08G 1/096775
2017/0046958 A1  2/2017 Naka et al.
2018/0053404 A1  2/2018 Horita et al.

FOREIGN PATENT DOCUMENTS

WO  WO-2015/186647 A1  12/2015
WO  WO-2016/167085 A1  10/2016

* cited by examiner

| RECOGNITION DATE | VEHICLE ID | VEHICLE MODEL | SENSOR TYPE | SPACE RECOGNITION INFORMATION | VEHICLE LOCATION INFORMATION | ROAD ENVIRONMENT INFORMATION | ... |
|---|---|---|---|---|---|---|---|
| 2016/9/15 15:15 | #1234 | SMALL VEHICLE | STEREO CAMERA | PROCEEDING VEHICLE IN 50 m AHEAD | LATITUDE···DEGREE LONGITUDE···DEGREE | IN TUNNEL | ... |
| 2016/9/15 15:16 | #1234 | SMALL VEHICLE | STEREO CAMERA | PROCEEDING VEHICLE IN 60 m AHEAD | LATITUDE···DEGREE LONGITUDE···DEGREE | TUNNEL EXIT | ... |
| ... | ... | ... | ... | ... | ... | ... | ... |

(Last three columns grouped as ENVIRONMENT INFORMATION)

FIG. 3

| ROAD NAME | LINK ID | LANE | OBJECT ID | OBJECT TYPE | OBJECT LOCATION INFORMATION | ... |
|---|---|---|---|---|---|---|
| LOCAL ROAD # | #234 | INBOUND | #012 | SPEED LIMIT SIGN | LATITUDE···DEGREE LONGITUDE···DEGREE | ... |
| LOCAL ROAD # | #234 | INBOUND | #013 | LOCATION GUIDANCE SIGN | LATITUDE···DEGREE LONGITUDE···DEGREE | ... |
| ... | ... | ... | ... | ... | ... | ... |

| RECOGNITION DATE | VEHICLE ID | VEHICLE MODEL | SENSOR TYPE | SPACE RECOGNITION INFORMATION | VEHICLE LOCATION INFORMATION | ROAD ENVIRONMENT INFORMATION | ... | FAILURE TYPE |
|---|---|---|---|---|---|---|---|---|
| 2016/9/15 15:15 | #1234 | SMALL VEHICLE | STEREO CAMERA | PROCEEDING VEHICLE IN 50 m AHEAD | LATITUDE…DEGREE LONGITUDE…DEGREE | IN TUNNEL | ... | A |
| 2016/9/15 15:16 | #1234 | SMALL VEHICLE | STEREO CAMERA | PROCEEDING VEHICLE IN 60 m AHEAD | LATITUDE…DEGREE LONGITUDE…DEGREE | TUNNEL EXIT | ... | — |
| ... | ... | ... | ... | ... | ... | ... | ... | ... |

FIG. 7

| FAILURE TYPE | FAILURE ENVIRONMENT INFORMATION | SENSOR TYPE | TYPE CONDITION | OCCURRENCE FREQUENCY | VEHICLE MODEL | ... |
|---|---|---|---|---|---|---|
| A | TUNNEL EXIT | STEREO CAMERA | DETERMINATION MODEL #1 | 10 TIMES/DAY | ALL VEHICLE TYPES | ... |
| B | LATITUDE···DEGREE LONGITUDE···DEGREE | MILLIMETER WAVE RADAR | DETERMINATION MODEL #2 | ONCE/DAY | SMALL VEHICLE | ... |
| ... | ... | ... | ... | ... | ... | ... |

ABNORMALITY DETECTION DEVICE AND ABNORMALITY DETECTION METHOD

BACKGROUND OF THE INVENTION

1. Field of the Invention

The present invention relates to an abnormality detection device and an abnormality detection method which detects an abnormality of an outside space recognition device mounted in a vehicle.

2. Description of the Related Art

In recent years, many vehicles have been provided with a safety device which detects a front vehicle to control a distance between vehicles and detects an obstacle to put on the brake. Further, in the near future, an automatic driving of a vehicle is also considered to be certain. In order to realize a device and an automatic driving to secure safety of such a vehicle, an outside space recognition device such as a radar or a camera is essential to recognize a situation of a space around the vehicle.

Therefore, if the outside space recognition device is necessary for a future vehicle from now, a technique of fast detecting a malfunction or a defect of the outside space recognition device (hereinafter, a state of a malfunction or a defect will be referred to as "abnormality" in this specification) is also necessary. The reason is because the automatic driving becomes impossible at once if the space recognition of the outside is not normal by an abnormality of the outside space recognition device, and the control of a distance between vehicles also has to depend on a driver's steering.

In addition, when an abnormality of the outside space recognition device is detected, it is important to detect the abnormality without error. However, the outside space recognition device may fail in the space recognition depending on the environment even though the outside space recognition device normally operates, or the space recognition may become not possible. For example, in the case of dense fog or heavy rain, the outside space recognition device may fail in recognizing a color of a traffic signal, or may not recognize the traffic signal itself. Therefore, it can be said that a failure of the space recognition due to an outside environment is at least not an abnormality of the outside space recognition device itself.

JP-2009-166541-A discloses an abnormality detection device which includes "an abnormality determination unit which determines whether there is an abnormality in a vehicle or an in-vehicle device on the basis of an output of the in-vehicle device indicating a vehicle state, a running environment information acquisition unit which acquires information related to a running environment affecting on the output of the in-vehicle device, and a determination condition change unit which changes a determination condition used in the abnormality determination unit on the basis of running environment information acquired by the running environment information acquisition unit (see Claim 1)".

In the disclosure according to JP-2009-166541-A, for example, a time taken from the engine activation to a temperature measurement of the coolant is changed according to an outside temperature in order to detect an abnormality of a temperature sensor of an engine coolant (see FIG. 2). Then, the temperature of the coolant is measured by the temperature sensor after a predetermined time elapses from the engine activation. In a case where the temperature does not exceed a predetermined temperature, it is determined that the temperature is abnormal. The "predetermined time" is changed according to the outside temperature such as spring and winter.

SUMMARY OF THE INVENTION

In order to detect an abnormality of the outside space recognition device such as a camera for the space recognition of the outside without error, there is a need to exclude space recognition information which fails in the space recognition due to the outside environment from the space recognition information (captured image, etc.) acquired when the space recognition fails. For example, an image of a traffic sign recognition failure acquired in dense fog is not a recognition failure caused by an abnormality of the outside space recognition device, but can be said as a recognition failure due to an abnormality of the environment. Therefore, the space recognition information (captured image, etc.) obtained when there is an environment abnormality is useless for the abnormality detection of the outside space recognition device and for investigating a cause of the abnormality, and moreover increases the number of man-hours for investigating a cause.

In the disclosure according to JP-2009-166541-A, the determination condition of normality/abnormality of a sensor mounted in a vehicle is changed according to a situation of the outside environment. However, the disclosure fails in describing that the sensor fails in detecting environment information depending on the environment. In addition, the sensor described in JP-2009-166541-A is to mainly detect an inner state of the vehicle, but a sensor (camera, etc.) to recognize the outside space is not taken into consideration. The outside space recognition device such as a camera to recognize the space is affected by the outside environment in various ways compared to a temperature sensor. Therefore, it is difficult to apply the disclosure according to JP-2009-166541-A to the outside space recognition device which recognizes the space.

The invention has been made in view of the above problems of the related art, and an object of the invention is to provide an abnormality detection device and an abnormality detection method in which a space recognition failure depending on an environment is effectively excluded so as to detect an abnormality of the outside space recognition device and to reduce the number of man-hours taken for investigating a cause of the abnormality.

An abnormality detection device according to the present invention is connected to a vehicle through a communication network, the vehicle being equipped with an outside space recognition device to acquire space recognition information by space recognition of the outside and an environment information acquisition device to acquire environment information containing location information, and detects an abnormality of the outside space recognition device. The abnormality detection device includes: an inter-vehicle communication unit that receives information, the information including the space recognition information which is transmitted from the vehicle and acquired by the outside space recognition device and the environment information which is acquired by the environment information acquisition device when the space recognition information is acquired; a space recognition success determination unit that determines whether a space recognition of the outside space recognition device when the space recognition information is acquired is successful on the basis of information which contains the space recognition information and the environment information received through the inter-vehicle communication unit; an environment dependence recognition failure classifying unit that determines the space recognition information determined as failing in the space recognition by the space recognition success determination unit about whether a failure of the space recognition corresponds to one of type conditions of a predetermined environment dependence space recognition failure, and classifies a type of the environment dependence space recognition failure; and an abnormality detection unit that uses the space recognition information determined as not corresponding to any one of the type conditions of the environment dependence space recognition failure by the environment dependence recognition failure classifying unit in the space recognition information determined as failing in the space recognition by the space recognition success determination unit to detect an abnormality of the outside space recognition device.

According to the invention, it is possible to provide an abnormality detection device and an abnormality detection method in which a space recognition failure depending on an environment is effectively excluded so as to detect an abnormality of an outside space recognition device and to reduce the number of man-hours taken for investigating a cause of the abnormality.

BRIEF DESCRIPTION OF THE DRAWINGS

FIGS. 10A-10C are diagrams illustrating an example of a display screen which is displayed on a map by a space recognition failure location display unit in which

DESCRIPTION OF THE PREFERRED EMBODIMENTS

Hereinafter, embodiments of the invention will be described in detail with reference to the drawings. Further, components common in the respective drawings will be attached with the same symbol, and a redundant description will be omitted.

Figure 1:
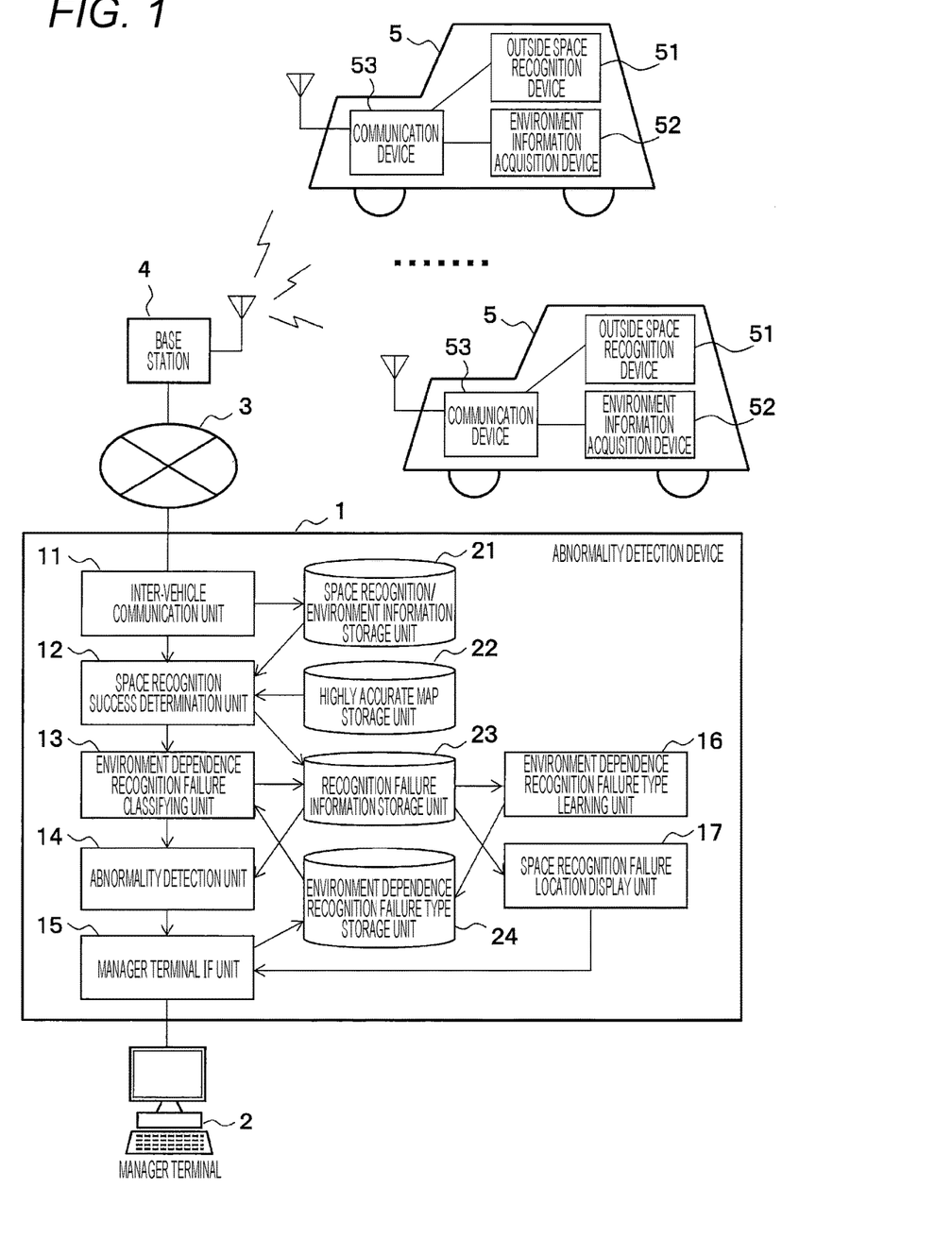
FIG. 1 is a diagram illustrating an exemplary configuration of an abnormality detection device according to an embodiment of the invention and an exemplary configuration of the entire system to which the abnormality detection device is applied.

FIG. 1 is a diagram illustrating an exemplary configuration of an abnormality detection device 1 according to an embodiment of the invention, and an exemplary configuration of the entire system to which the abnormality detection device 1 is applied. As illustrated in FIG. 1, the abnormality detection device 1 is connected to a communication device 53 through a communication network 3 such as the Internet and a base station 4 such as a mobile telephone network. The communication device 53 is mounted in each of a plurality of running vehicles 5. Further, as described above, the vehicle 5 which includes the communication device 53 and is connected to a so-called host cloud system through the communication network 3 is called a connected car in some cases.

In this embodiment, the vehicle 5 (the connected car) includes an outside space recognition device 51 and an environment information acquisition device 52 besides the communication device 53.

The outside space recognition device 51 is configured by a space recognition sensor such as a camera or a laser radar which recognizes a situation (that is, space) of the outside of the vehicle 5, and recognizes other vehicles around the vehicle 5, pedestrians, obstacles, road signs, and lanes. Further, the outside space recognition device 51 is not limited to one space recognition sensor, and may be configured by a plurality or a plural types of space recognition sensors.

The environment information acquisition device 52 is configured by a plural types of sensors such as a GPS (Global Positioning System) receiver, an azimuth sensor, a vibration sensor, and a rainfall sensor. Then, with these sensors, environment information such as location information (longitude, latitude, etc.) of the vehicle 5, information of a running direction, a road surface condition, weather information (rainfall, snowfall, etc.), and attribute information (running in a tunnel, etc.) regarding a running location are acquired. Further, in this specification, the information acquired by the outside space recognition device 51 is collectively called space recognition information, and the information (including the location information) acquired by the environment information acquisition device 52 is collectively called environment information.

The communication device 53 transmits information which is configured by the space recognition information acquired by the outside space recognition device 51, the environment information acquired by the environment information acquisition device 52, and a statistics information thereof to the abnormality detection device 1 through the communication network 3 as space recognition/environment information of the vehicle 5. The abnormality detection device 1 detects an abnormality of the outside space recognition device 51 mounted in the vehicle 5 on the basis of the space recognition/environment information transmitted from the vehicle 5.

The abnormality detection device 1 includes a block related to functional processes such as an inter-vehicle communication unit 11, a space recognition success determination unit 12, an environment dependence recognition failure classifying unit 13, an abnormality detection unit 14, a manager terminal IF unit 15, an environment dependence recognition failure type learning unit 16, and a space recognition failure location display unit 17. Further, the abnormality detection device 1 includes a block related to storing functions such as a space recognition/environment information storage unit 21, a highly accurate map storage unit 22, a recognition failure information storage unit 23, and an environment dependence recognition failure type storage unit 24. Hereinafter, the processing contents and the configurations of these blocks will be described with reference to FIGS. 1 and 2, and also the other drawings.

Further, the abnormality detection device 1 having the above configuration may be realized by a computer which includes an operational processing device and a storage device. In other words, the functions of the block related to the functional processes of the abnormality detection device 1 are realized such that the operational processing device of the computer performs a program stored in the storage device. In addition, the block related to the storing function is realized on the storage device.

(1) Inter-vehicle communication unit 11 and Space recognition/environment information storage unit 21

The inter-vehicle communication unit 11 receives the space recognition/environment information transmitted from the communication device 53 of the vehicle 5, and temporarily stores the received space recognition/environment information in the space recognition/environment information storage unit 21.

Figure 2:
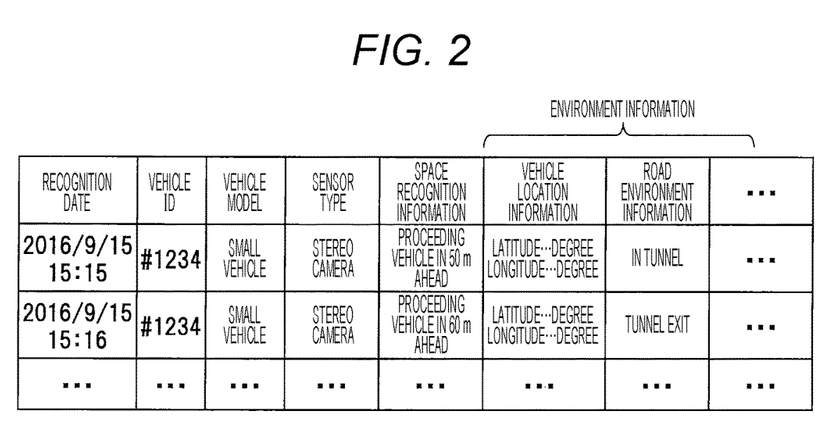
FIG. 2 is a diagram illustrating an exemplary configuration of space recognition/environment information which is stored in a space recognition/environment information storage unit.

FIG. 2 is a diagram illustrating an exemplary configuration of the space recognition/environment information which is stored in the space recognition/environment information storage unit 21. As illustrated in FIG. 2, the space recognition/environment information is configured by items, for example, "recognition date", "vehicle ID", "vehicle model", "sensor type", "space recognition information", "vehicle location information", and "road environment information".

Herein, the "space recognition information" is acquired by the space recognition of the outside space recognition device 51 of the vehicle 5. For example, information such as "proceeding vehicle in 60m ahead" and "road sign in 100m ahead" are included. Alternatively, the "space recognition information" may be an image itself captured by a camera. In addition, the "sensor type" is a type of the space recognition sensor such as a stereo camera, a monocular camera, a millimeter wave radar, a laser radar which acquires the "space recognition information". Therefore, the "sensor type" and the "space recognition information" may be called a set of information configured by associating each other, but a plurality of sets of the "sensor type" and the "space recognition information" may be contained in one piece of space recognition/environment information.

The "vehicle location information" and the "road environment information" are the environment information acquired by the environment information acquisition device 52 of the vehicle 5. Besides, various types of information such as the "running direction information", the "weather information", and the "road surface information" are contained as the environment information. Further, the environment information is assumed to be acquired almost at the same timing as the "space recognition information" is acquired.

The "recognition date" is information indicating a date when the "space recognition information" contained in the space recognition/environment information is acquired. In addition, the "vehicle ID" is information for uniquely identifying the vehicle 5 mounted with the communication device 53 which transmits the space recognition/environment information. In addition, the "vehicle model" is information indicating a size of the vehicle 5 such as "large vehicle" and "small vehicle", and information indicating a shape of the vehicle 5 such as "sedan" and "minivan".

(2) Highly Accurate Map Storage Unit 22

Figure 3:
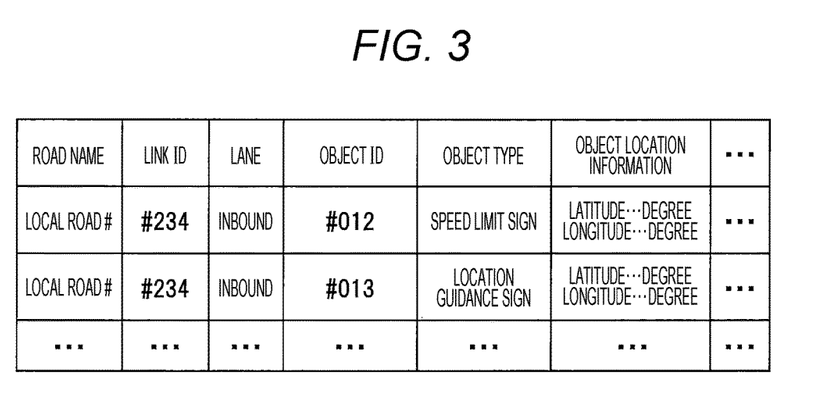
FIG. 3 is a diagram illustrating an exemplary configuration of object location information which is part of highly accurate map information stored in a highly accurate map storage unit.

FIG. 3 is a diagram illustrating an exemplary configuration of object location information which is part of highly accurate map information stored in the highly accurate map storage unit 22. As illustrated in FIG. 3, the object location information of the highly accurate map information is information configured by associating a target (for example, traffic signs; hereinafter, referred to as object) to be recognized by the outside space recognition device 51 of the vehicle 5 with the location information indicating where the object is located. For example, the object location information is configured by items such as "road name", "link ID", "lane", "object ID", "object type", and "object location information".

Herein, the "object ID" is information for identifying an object to be recognized by the outside space recognition device 51 of the vehicle 5. The "object type" is information indicating a type of the object (for example, the type of a traffic sign, etc.). In addition, the "object location information" is information indicating a location where the object is provided. The "link ID" is information for identifying a road where the object is provided. The "lane" is information for identifying a lane where the object is recognized. Further, the link means a road connecting an intersection and an intersection, or an intersection and a junction. The "road name" means a name of a national road or a prefectural road to which the link belongs.

In this embodiment, the object location information of the highly accurate map information configured as above is assumed to be previously stored in the highly accurate map storage unit 22.

(3) Space Recognition Success Determination Unit 12

The space recognition success determination unit 12 (see FIG. 1) determines whether the space recognition information recognized by the outside space recognition device 51 of the vehicle 5 is exactly identified on the basis of the space recognition/environment information transmitted from the vehicle 5 and the highly accurate map information stored in the highly accurate map storage unit 22. In other words, it is determined whether the outside space recognition device 51 succeeds or fails in space recognition.

Figure 4:
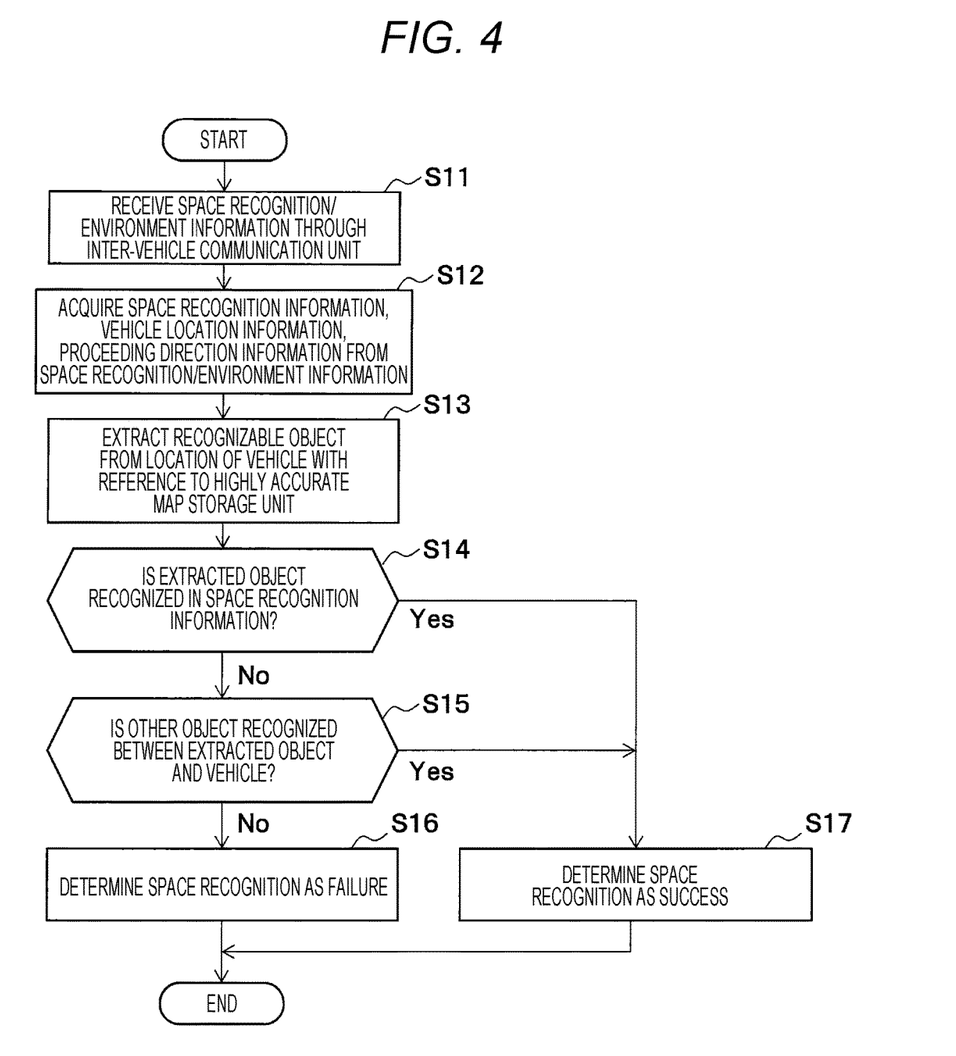
FIG. 4 is a diagram illustrating an exemplary processing flow of a space recognition success determination of a space recognition success determination unit.

FIG. 4 is a diagram illustrating an exemplary processing flow of a space recognition success determination of the space recognition success determination unit 12. As illustrated in FIG. 4, the space recognition success determination unit 12 first receives the space recognition/environment information transmitted from the vehicle 5 through the inter-vehicle communication unit 11 (Step S11). Then, the space recognition success determination unit 12 acquires the space recognition information, the vehicle location information, and the running direction information (not illustrated in FIG. 2) from the received space recognition/environment information (see FIG. 2) (Step S12).

Next, the space recognition success determination unit 12 extracts an object such as a traffic sign which is recognizable from the location indicated by the vehicle location information with reference to the highly accurate map storage unit 22 on the basis of the vehicle location information and the running direction information of the vehicle 5 (Step S13). Then, the space recognition success determination unit 12 determines whether the extracted object is recognized in the acquired space recognition information (Step S14). Then, in a case where it is determined that the extracted object is not recognized (No in Step S14), the space recognition success determination unit 12 determines whether another object is recognized between the extracted object and the vehicle 5 (Step S15).

Then, in a case where it is determined in Step S15 that there is no other recognized object between the extracted object and the vehicle 5 (No in Step S15), the space recognition information determines that the space recognition information is failed in the space recognition (Step S16). Further, the space recognition information failed in the space recognition and the environment information incident thereon are accumulated in the recognition failure information storage unit 23 (see FIG. 1) as recognition failure information.

On the other hand, in a case where it is determined that the extracted object is recognized in Step S14 (Yes in Step S14), the space recognition information is determined as successful in the space recognition (Step S17). In addition, even in a case where it is determined in Step S15 that there is another object between the extracted object and the vehicle 5 (Yes in Step S15), the space recognition information is determined as successful in the space recognition (Step S17).

The case where it is determined as Yes in Step S15 occurs, for example, in a case where the proceeding vehicle is a large bus and a traffic sign in front of the large bus is not able to be recognized. The space recognition information acquired in such a case is determined as successful in the space recognition.

Figure 5:
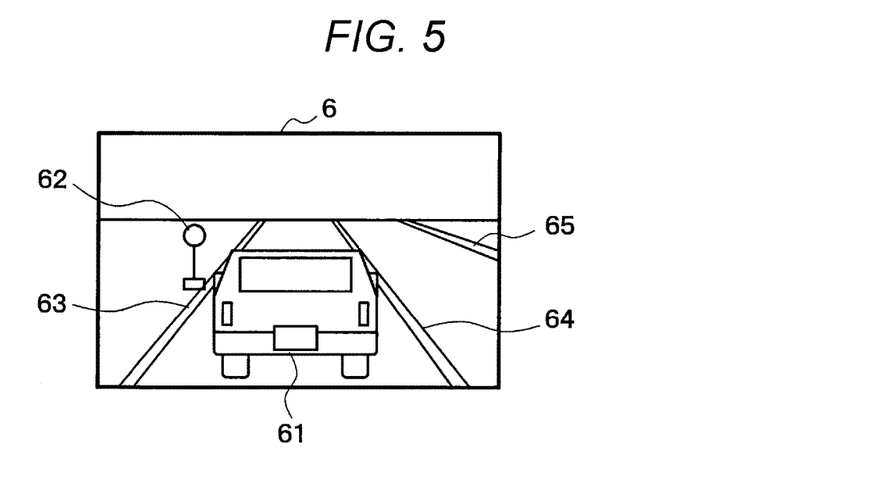
FIG. 5 is a diagram illustrating an example of a forward image which is captured by an outside space recognition device mounted in a vehicle.

FIG. 5 is a diagram illustrating an example of a forward image 6 which is captured by the outside space recognition device 51 mounted in the vehicle 5. Further, the outside space recognition device 51 in that case is a stereo camera, and a proceeding vehicle 61, a road sign 62, and lanes 63, 64, and 65 are recognized in the forward image 6. In the case of FIG. 5, the road sign 62 is extracted as an object recognizable from the highly accurate map in Step S13 of FIG. 4. Therefore, the road sign 62 is not recognized in the forward image 6 in Step S14. Further, in a case where it is determined in Step S15 that there is no other recognized object which hides the road sign 62 between the vehicle 5 (subject vehicle) and the road sign 62, it is determined in Step S16 that the space recognition of the road sign 62 is failed.

Further, the space recognition success determination of the space recognition success determination unit 12 is not limited to the processing flow illustrated in FIG. 4. The space recognition may be determined without using an object stored in the highly accurate map information. For example, in a case where a proceeding vehicle recognized so far abruptly disappears and is not recognized during the vehicle is running on a road having no intersection at a predetermined speed or more, the space recognition information obtained at that time may be determined as failing in the space recognition.

In addition, it is possible to determine that the outside space recognition device 51 fails in the space recognition even by comparing the space recognition information acquired by the vehicle 5 with the space recognition information acquired by another vehicle 5 running on the front or rear side. This case is also limited to a case where the other vehicle 5 running on the front or rear side is a connected car having the configuration illustrated in FIG. 1. In such a case, the abnormality detection device 1 according to this embodiment can obtain a plurality of pieces of space recognition information of the same road location (for example, the forward image 6) even though the time is slightly different by the outside space recognition devices 51 of the plurality of vehicles 5.

Therefore, the forward image 6 obtained by a certain vehicle 5 is compared to the forward image 6 obtained by the other vehicle 5 which is running on the front or rear side for example. Then, it is considered that the forward image 6 obtained by the subject vehicle 5 does not recognize a parked vehicle on the road for example, but the parked vehicle is recognized in the forward images 6 obtained by other two vehicles 5 running on the front or rear side. In such a case, the outside space recognition device 51 of the subject vehicle 5 may determine that the space recognition is failed according to the principle of majority rule.

(4) Recognition Failure Information Storage Unit 23

Figure 6:
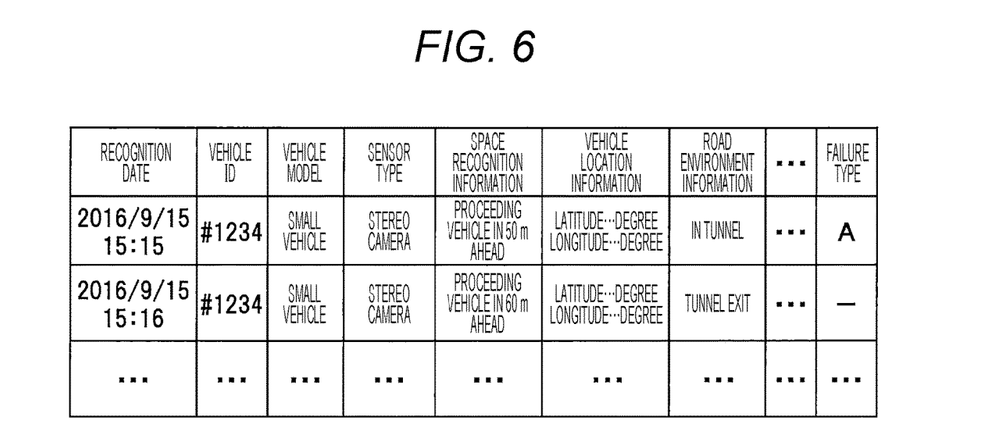
FIG. 6 is a diagram illustrating an exemplary configuration of recognition failure information which is stored in a recognition failure information storage unit.

FIG. 6 is a diagram illustrating an exemplary configuration of the recognition failure information which is accumulated in the recognition failure information storage unit 23. As illustrated in FIG. 6, the recognition failure information is configured by items, for example, "recognition date", "vehicle ID", "vehicle model", "sensor type", the "space recognition information", "vehicle location information", "road environment information", . . . , and "failure type". The "failure type" in this configuration is added to the space recognition/environment information illustrated in FIG. 2.

Herein, the "failure type" is information indicating a type of a space recognition failure of the environment dependence, which is written in the environment dependence recognition failure classifying unit 13. The "failure type" will be described using FIG. 7 below.

(5) Environment Dependence Recognition Failure Type Storage Unit 24

Figure 7:
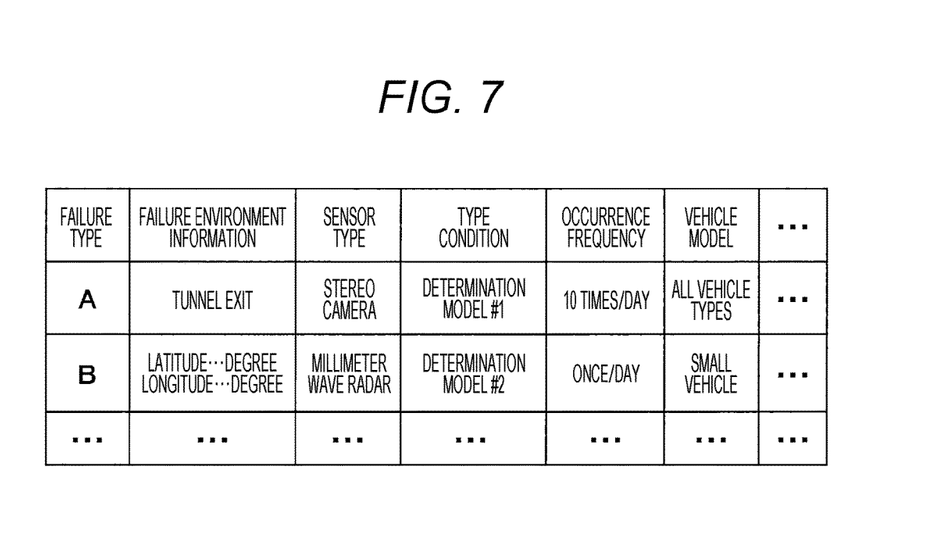
FIG. 7 is a diagram illustrating an exemplary configuration of environment dependence recognition failure type information which is stored in the environment dependence recognition failure type storage unit.

FIG. 7 is a diagram illustrating an exemplary configuration of environment dependence recognition failure type information which is stored in the environment dependence recognition failure type storage unit 24. The environment dependence recognition failure type information is information for classifying the space recognition information failed in the space recognition depending on environment into some types. As illustrated in FIG. 7, the environment dependence recognition failure type information is configured by items such as "failure type", "failure environment information", "sensor type", "type condition", "occurrence frequency", and "vehicle model".

Herein, the "failure type" is information to identify a type of the environment dependence recognition failure, and may be a series of characters or numbers or may be a name. In addition, the "failure environment information" is information indicating a feature of the environment information when the environment dependence recognition failure occurs, in which location information specified by a longitude and a latitude, information indicating a running environment such as a specific area and a tunnel, and weather information such as sunny and rainy are stored. In addition, the "sensor type" is information indicating a type of the space recognition sensor which fails in the environment dependence space recognition, in which a name of the space recognition sensor such as a stereo camera, a monocular camera, and a millimeter wave radar is stored.

The "type condition" is information indicating a condition of determining the space recognition information determined as failing in the space recognition by the space recognition success determination unit 12 whether the failure of the space recognition belongs to a type of the environment dependence recognition failure. Further, a determination model used as the "type condition" is set in advance on the basis of a result obtained by analyzing the recognition failure information accumulated in the recognition failure information storage unit 23 by a system manager. Then, after the entire system illustrated in FIG. 1 is activated including the abnormality detection device 1, the determination model used in the "type condition" is appropriately updated by the environment dependence recognition failure type learning unit 16.

In addition, the "occurrence frequency" is statistics information indicating an occurrence frequency of "failure type" in the environment dependence recognition, and is appropriately calculated by the environment dependence recognition failure type learning unit 16. In addition, the "vehicle model" is information to specify a vehicle model in which the environment dependence recognition failure type occurs, and shows a vehicle model that causes the environment dependent recognition failure type a lot.

Further, as an item of the environment dependence recognition failure type information, there may be included a maker name of hardware, a model number, a version number, and a version number of a control program of the space recognition device of the outside space recognition device 51. Further, in this case, it is a matter of course that such information is necessarily included in the space recognition/ environment information transmitted from the vehicle 5.

Figure 8:
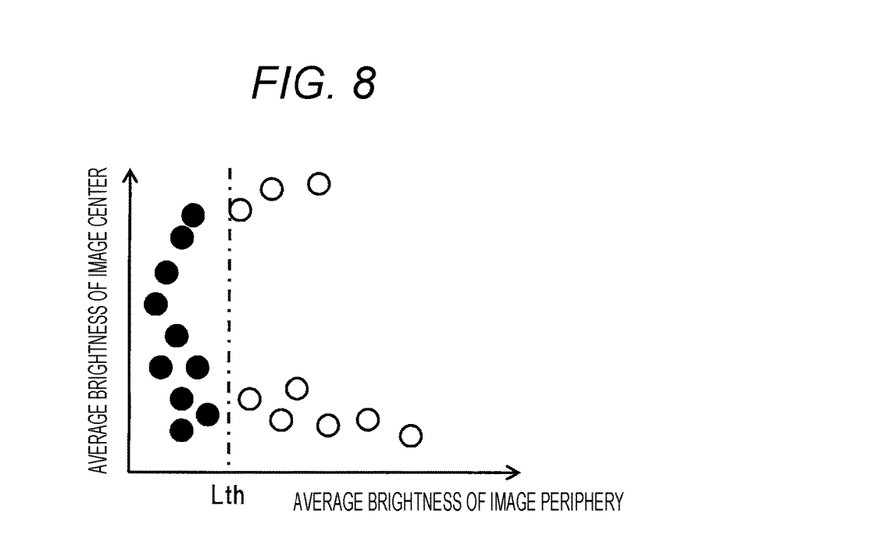
FIG. 8 is a diagram illustrating an example of a determination model which is used as "type condition" of FIG. 7.

FIG. 8 is a diagram illustrating an example of the determination model used as the "type condition" of FIG. 7. Herein, the description will be given about an example of the determination model in which the environment dependence recognition failure occurring in the stereo camera is determined when the vehicle runs a long tunnel and exits the tunnel. When the vehicle 5 is running a long tunnel, a brightness of a captured image obtained from the stereo camera becomes small mostly. Thereafter, when the exit of the tunnel appears, and the exposure is adjusted for the center portion of the capturing image, the center portion is over-exposed and the peripheral portion is under-exposed, and the space recognition may fail without obtaining parallax due to the strong light of the sun shining in the exit.

Therefore, a relation between average brightness of the peripheral image and the center image is obtained, and the captured image (space recognition information) obtained in the past by the stereo camera of the vehicle 5 during running the long tunnel and arriving at the exit can be expressed by a scatter diagram of FIG. 8. Further, in the scatter diagram of FIG. 8, the horizontal axis represents an average brightness of the peripheral portion of the image, the vertical axis represents an average brightness of the center portion of the image, white circles indicate a space recognition success, and black circles indicate a space recognition failure.

According to the graph of FIG. 8, it can be seen that, when the vehicle runs a long tunnel and arrives at the exit, the space recognition failure occurring in the stereo camera does not depend on the average brightness of the center portion of the image, but occurs when the average brightness of the peripheral portion of the image is smaller than a threshold Lth. Therefore, in this case, a condition that the average brightness of the peripheral portion of the image is smaller than the predetermined threshold Lth may be employed as a determination model of the "type condition" of the "failure type".

As described in the above example, the determination model of the "type condition" is preferably expressed by an inequation indicating a correlation between a detection value of the outside space recognition device 51 and a detection value of the environment information acquisition device 52 and parameters which are contained in the inequation. Further, the detection value of the outside space recognition device 51 described above is an output value (brightness of the image) of the space recognition sensor such as a stereo camera, and the detection value of the environment information acquisition device 52 is location information output by the GPS receiver.

(6) Environment Dependence Recognition Failure Classifying Unit 13

The environment dependence recognition failure classifying unit 13 determines and classifies the space recognition information determined as failing in the space recognition by the space recognition success determination unit 12 about whether the failure in the space recognition corresponds to one of type conditions of the predetermined environment dependence recognition failure type. Then, at the time of the classification, the information related to the environment dependence recognition failure type is stored in the environment dependence recognition failure type storage unit 24 in advance.

Figure 9:
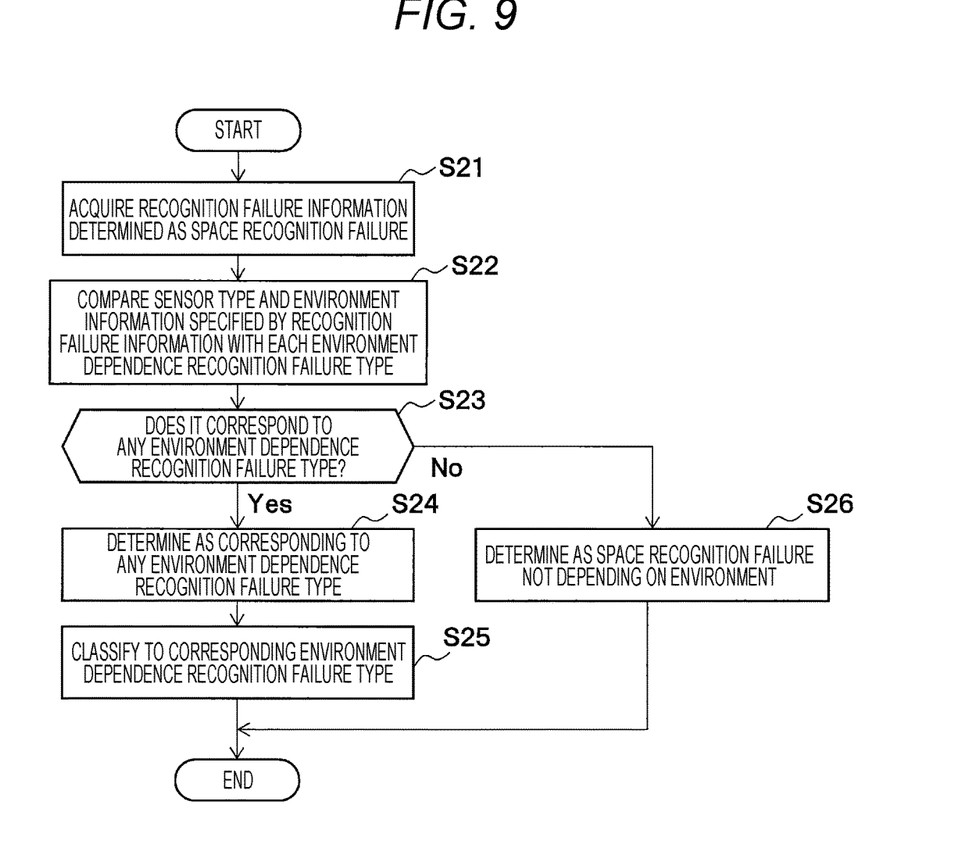
FIG. 9 is a diagram illustrating an exemplary processing flow of an environment dependence recognition failure classification of an environment dependence recognition failure classifying unit.

FIG. 9 is a diagram illustrating an exemplary processing flow of an environment dependence recognition failure classification of the environment dependence recognition failure classifying unit 13. The environment dependence recognition failure classifying unit 13 acquires the recognition failure information determined as a space recognition failure by the space recognition success determination unit 12 (Step S21). Further, the recognition failure information described above is substantially the same as the space recognition/environment information transmitted from the vehicle 5 as illustrated in FIG. 6. In FIG. 6, a failure type is added to the space recognition/environment information. Such addition is performed at the end of the process of the environment dependence recognition failure classification.

Next, the environment dependence recognition failure classifying unit 13 compares a sensor type and the environment information specified by the recognition failure information with each environment dependence recognition failure type (Step S22). In other words, the sensor type and the environment information specified by the recognition failure information are compared with the failure environment, the sensor type, and the type condition specified by each environment dependence recognition failure type information. Further, the environment information specified by the recognition failure information also includes the space recognition information included in the recognition failure information (for example, an average brightness of a predetermined area of the image derived from the forward image 6 (see FIG. 5) acquired by the stereo camera).

Next, the environment dependence recognition failure classifying unit 13 determines an environment dependence recognition failure type to which the sensor type and the environment information specified by the recognition failure information correspond (Step S23). As a result of the determination, in a case where it is determined that the sensor type and the environment information correspond to an environment dependence recognition failure type (Yes in Step S23), the space recognition when the space recognition information included in the recognition failure information is acquired is determined as a space recognition failure which depends on the environment (Step S24). Then, the recognition failure information is classified into the environment dependence recognition failure type (Step S25), and the information of the failure type is written to a column "failure type" of the recognition failure information (see FIG. 6).

On the other hand, in a case where it is determined that the sensor type and the environment information do not correspond to any environment dependence recognition failure type (No in Step S23), the space recognition when the space recognition information included in the recognition failure information is acquired is determined as a space recognition failure which does not depend on the environment (Step S26). Then, the recognition failure information is not classified to any environment dependence recognition failure type and, for example, a symbol "-" indicating a space recognition failure which does not depend on the environment is written in a column of "failure type" of the recognition failure information (see FIG. 6).

(7) Abnormality Detection Unit 14 and Manager Terminal IF Unit 15

The abnormality detection unit 14 provides information from which the information determined as the environment dependence recognition failure by the environment dependence recognition failure classifying unit 13 is removed in the space recognition information determined as a space recognition failure by the space recognition success determination unit 12, to the system manager as abnormality detection information of the outside space recognition device 51. In other words, in the recognition failure information accumulated in the recognition failure information storage unit 23, only the recognition failure information which is not classified into any environment dependence recognition failure type is provided to the system manager through the manager terminal IF unit 15 and the manager terminal 2.

In other words, in this embodiment, a space recognition failure which is not abnormal to the outside space recognition device 51 (space recognition sensor) itself but occurs depending on a specific environment is not considered as an abnormality. Therefore, the system manager can investigate a cause of the abnormality using only the recognition failure information caused by the outside space recognition device 51. As a result, in this embodiment, it is possible to reduce the number of man-hours and a cost taken for investigating the cause of the abnormality occurring in the outside space recognition device 51.

(8) Environment Dependence Recognition Failure Type Learning Unit 16

The environment dependence recognition failure type learning unit 16 collects the recognition failure information accumulated in the recognition failure information storage unit 23 for each failure type at every predetermined period (for example, 7 days), and statistically processes detection values (brightness of a captured image, an output value of the GPS receiver, etc.) of various types of sensors which are included in each recognition failure information. Then, the type condition included in the environment dependence recognition failure type information of each failure type is learned on the basis of the result, and the type condition is updated. Further, any type of learning method may be used in this case, and a mechanical learning algorithm may be used for example.

(9) Space Recognition Failure Location Display Unit 17

The space recognition failure location display unit 17 displays a map in a display device of the manager terminal 2 with an occurrence location of the past space recognition failure accumulated in the recognition failure information storage unit 23.

Figure 10A:
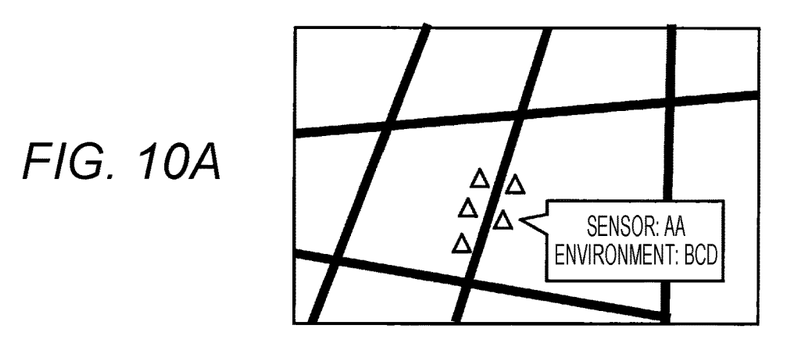
FIG. 10A is a diagram illustrating an example of a map displaying occurrence locations of space recognition failures in a case where a space recognition sensor failed in space recognition and environment information are specified.
Figure 10B:
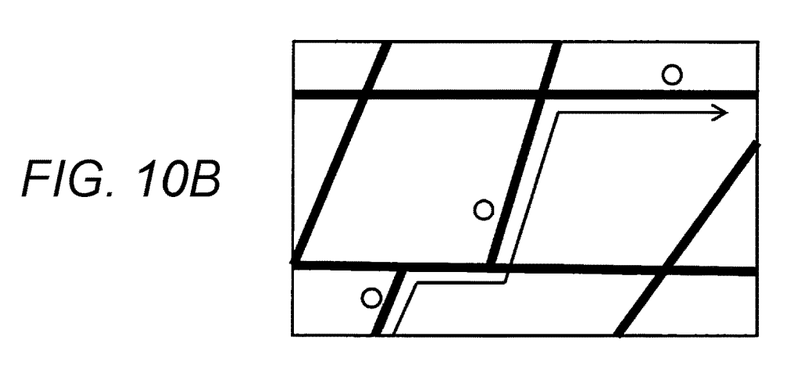
FIG. 10B is a diagram illustrating an example of a map displaying locations of space recognition failures occurring along a running path of a specific vehicle.
Figure 10C:
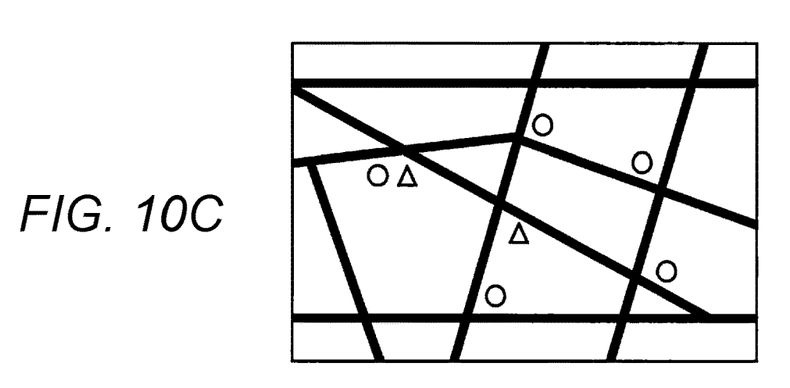
FIG. 10C is a diagram illustrating an example of a map displaying locations of all the space recognition failures occurring in a specific area.

FIGS. 10A-10C are diagrams illustrating an example of a display screen in which a map is displayed by the space recognition failure location display unit 17. FIG. 10A is a diagram illustrating an example of a map displaying occurrence locations of space recognition failures in a case where the space recognition sensor and the environment information failed in the space recognition are specified. FIG. 10B is a diagram illustrating an example of a map displaying the locations of the space recognition failures occurring along a running path of a specific vehicle. FIG. 10C is a diagram illustrating an example of a map displaying the locations of all the space recognition failures occurring in a specific area. Further, in FIGS. 10A-10C, thick solid lines represent roads, triangles and circles represent locations where the space recognition failure occurs, and a thin arrow line represents a running path of the vehicle.

In the display screen of FIG. 10A, the locations of the space recognition failure occurring at the time when the space recognition sensor is "AA" and the environment information is "BCD" are depicted by a triangle. Further, the space recognition failures may not depend on the environment, or may depend on the environment. The space recognition failures may be not distinguished from each other. Furthermore, the space recognition failure may be used to specify a type of the environment dependence failure.

With such a map display, the system manager can visually and easily grasp a space recognition sensor, an environment, and a place that the space recognition failure easily occurs.

In addition, the locations of the space recognition failure occurring along the running path of a specific vehicle are displayed on the map in the display screen of FIG. 10B. Therefore, the system manager can visually and easily grasp the space recognition failure with respect to a specific vehicle about where the space recognition failure occurs and which order the space recognition failures occurs.

In addition, the locations of all the space recognition failures occurring in the area are displayed on the map in the display screen of FIG. 10C. Herein, for example, the circles indicate the recognition failure which does not depend on the environment, and the triangles indicate the recognition failure which depends on the environment. Even if it is determined as a recognition failure which does not depend on the environment from such a display screen, there is a possibility that the system manager may find out a determination model of a new environment dependence failure type from the occurrence location or the environment feature.

As described above, the space recognition failure location display unit 17 displays the occurrence locations of the past space recognition failure in a various forms on a map. Therefore, the system manager may reduce the number of man-hours taken for investigating a cause of the recognition failure which does not depend on the environment. Further, there is no need to investigate a cause of the space recognition failure if the determination model of a new environment dependence failure can be found out. Therefore, the number of man-hours taken for investigating a cause of the recognition failure which does not depend on the environment is reduced.

Hitherto, according to the embodiment of the invention, the space recognition failure which depends on the environment is excluded from the space recognition failure occurring in the outside space recognition device 51 of the vehicle 5 since the space recognition failure is not caused by an abnormality of the outside space recognition device 51 according to a predetermined type condition (determination model). In other words, the space recognition failure which depends on the environment does not need to be investigated about the cause. Therefore, the system manager may investigate a cause of the abnormality of the outside space recognition device 51 using the space recognition failure information from which the environment dependence space recognition failure information is excluded. Accordingly, the number of man-hours taken for investigating a cause of the abnormality of the outside space recognition device 51 is reduced.

Further, the above-described abnormality detection device 1 may be an abnormality detection device of a cloud type, and an in-vehicle abnormality detection device which is mounted in each vehicle 5 will be additionally described as another embodiment. The in-vehicle abnormality detection device (not illustrated) is mounted in the vehicle 5, and is configured by removing the inter-vehicle communication unit 11 from the configuration of the abnormality detection device 1 illustrated in FIG. 1. The in-vehicle abnormality detection device can directly acquire the outside space recognition information and the environment information from the outside space recognition device 51 and the environment information acquisition device 52 which are mounted in the same vehicle 5.

In addition, the display device corresponding to the manager terminal 2 illustrated in FIG. 1 is necessary in order to display an abnormal detection result of the abnormality detection unit 14. However, for example, a display device belonging to a car navigation device may be used as the display device.

In addition, in the case of the in-vehicle abnormality detection device, there is a concern that the recognition failure information to be accumulated in the recognition failure information storage unit 23 is not collected enough. For such a case, the communication device 53 mounted in the vehicle 5 does not communicate with the base station 4 but to communicate with other communication device 53 mounted in other vehicle 5 running near the subject vehicle. Then, the abnormality detection device mounted in a certain vehicle 5 exchanges the recognition failure information and the environment dependence recognition failure type information which are accumulated in the abnormality detection device by communicating with the abnormality detection device mounted in other vehicle 5 running near the subject vehicle.

With such a configuration, the recognition failure information and the environment dependence recognition failure type information accumulated in the in-vehicle abnormality detection device can be increased. Therefore, the abnormality detection of the abnormality detection device can be increased in accuracy. In addition, an abnormality can be informed to a driver of the vehicle 5, and a notification such as "Maintenance or Repair in a car center is recommended" can be displayed in the display device such as a car navigation device.

The invention is not limited to the above-described embodiments and modifications, and various modifications can be made. For example, the embodiments and the modifications are described in a clearly understandable way for the invention, and thus the invention is not necessarily to provide all the configurations described above. In addition, some configurations of a certain embodiment or modification may be replaced with the configurations of another embodiment or modification, and the configuration of the other embodiment or modification may also be added to the configuration of a certain embodiment or modification. In addition, some of the configurations of each embodiment or modification can be added, removed, or replaced with the configurations of the other embodiment or modification.

What is claimed is:

1. An abnormality detection device that is connected to a vehicle through a communication network, the vehicle being equipped with an outside space recognition device comprising one or more sensors to acquire space recognition information by space recognition of the outside and an environment information acquisition device comprising one or more sensors to acquire environment information containing location information, and detects an abnormality of the outside space recognition device, the abnormality detection device comprising a processor configured to:
receive information including the space recognition information which is transmitted from the vehicle and acquired by the outside space recognition device and the environment information which is acquired by the environment information acquisition device when the space recognition information is acquired;
determine whether a space recognition of the outside space recognition device when the space recognition information is acquired is successful on the basis of information which contains the space recognition information and the environment information received from the vehicle;
determine the space recognition information determined as failing in the space recognition by the processor regarding whether a failure of the space recognition corresponds to one of type conditions of a predetermined environment dependence space recognition failure, and classify a type of the environment dependence space recognition failure; and
use the space recognition information determined as not corresponding to any one of the type conditions of the environment dependence space recognition failure in the space recognition information determined as failing in the space recognition to detect an abnormality of the outside space recognition device,
wherein the abnormality detection device further comprises a recognition failure information storage unit that accumulates information, which is obtained by associating the space recognition information determined as failing in the space recognition by the processor and the environment information acquired by the environment information acquisition device when the space recognition information is acquired, as recognition failure information, and
wherein the processor is further configured to learn and update the type condition to determine a type of the environment dependence space recognition failure using the recognition failure information accumulated in the recognition failure information storage.

2. The abnormality detection device according to claim 1, further comprising:
a space recognition failure location display that displays an occurrence location of a past space recognition failure on a map on the basis of the recognition failure information accumulated in the recognition failure information storage.

3. The abnormality detection device according to claim 1, further comprising:
a highly accurate map storage that stores location information of an object to be recognized by the outside space recognition device, wherein the processor is further configured to determine whether the space recognition of the outside space recognition device is successful on the basis of the space recognition information acquired by the space recognition, the location information contained in the environment information acquired by the environment information acquisition device when the space recognition information is acquired, and the location information of the object stored in the highly accurate map storage.

4. The abnormality detection device according to claim 1, wherein the processor is further configured to determine whether the space recognition of the outside space recognition device is successful on the basis of the space recognition information acquired by the space recognition and another space recognition information obtained by the outside space recognition device which is mounted in each of a plurality of vehicles running on the front or rear side of a vehicle in which the outside space recognition device is mounted.

5. An abnormality detection device that is mounted in a vehicle equipped with an outside space recognition device comprising one or more sensors to acquire space recognition information by space recognition of the outside and an environment information acquisition device comprising one or more sensors to acquire environment information containing location information, and detects an abnormality of the outside space recognition device, the abnormality detection device comprising a processor configured to:

determine whether the space recognition of the outside space recognition device is successful on the basis of the space recognition information acquired by the outside space recognition device and the environment information containing the location information acquired by the environment information acquisition device when the space recognition information is acquired;

determine the space recognition information determined as failing in the space recognition by the processor regarding whether a failure of the space recognition corresponds to one of type conditions of a predetermined environment dependence space recognition failure, and classify a type of the environment dependence space recognition failure; and use the space recognition information determined as not corresponding to any one of the type conditions of the environment dependence space recognition failure in the space recognition information determined as failing in the space recognition to detect an abnormality of the outside space recognition device, wherein the abnormality detection device further comprises a recognition failure information storage that accumulates information, which is obtained by associating the space recognition information determined as failing in the space recognition by the processor and the environment information acquired by the environment information acquisition device when the space recognition information is acquired, as recognition failure information, and wherein the processor is further configured to learn and update the type condition to determine a type of the environment dependence space recognition failure using the recognition failure information accumulated in the recognition failure information storage.

6. An abnormality detection method of detecting an abnormality of an outside space recognition device by a computer connected to a vehicle through a communication network, the vehicle being equipped with the outside space recognition device comprising one or more sensors to acquire space recognition information by space recognition of the outside and an environment information acquisition device comprising one or more sensors to acquire environment information containing location information, the method comprising:

receiving, by the computer, information which contains the space recognition information acquired by the outside space recognition device transmitted from the vehicle and the environment information acquired by the environment information acquisition device when the space recognition information is acquired, determining, by the computer, whether the space recognition of the outside space recognition device when the space recognition information is acquired is successful on the basis of the information which contains the space recognition information and the environment information in the receiving, classifying, by the computer, a type of an environment dependence space recognition failure by determining whether a failure of the space recognition corresponds to any one of type conditions of a predetermined environment dependence space recognition failure with respect to the space recognition information determined as failing in the space recognition in the determining, and using, by the computer, the space recognition information determined that the type of the environment dependence space recognition failure does not correspond to any type condition in the classifying in the space recognition information determined as failing in the space recognition in the determining in order to detect an abnormality of the outside space recognition device, wherein the computer further comprises a storage device that accumulates information, which is obtained by associating the space recognition information determined as failing in the space recognition in the determining and the environment information acquired by the environment information acquisition device when the space recognition information is acquired, as recognition failure information, and wherein the computer learns and updates the type condition to determine a type of the environment dependence space recognition failure using the recognition failure information accumulated in the storage device.

7. The abnormality detection method according to claim 6, wherein the computer is caused to further perform displaying an occurrence location of a past space recognition failure on a map on the basis of the recognition failure information accumulated in the storage device.

* * * * *